Jan. 13, 1953  R. STEINECK  2,625,087
CONSTRUCTION FOR CAMERAS
Filed May 12, 1949  5 Sheets-Sheet 1

INVENTOR.
Rudolf Steineck
BY
Attorney

Jan. 13, 1953   R. STEINECK   2,625,087
CONSTRUCTION FOR CAMERAS
Filed May 12, 1949   5 Sheets-Sheet 3

INVENTOR.
Rudolf Steineck
BY
Attorney

Jan. 13, 1953  R. STEINECK  2,625,087
CONSTRUCTION FOR CAMERAS
Filed May 12, 1949  5 Sheets-Sheet 4

INVENTOR.
Rudolf Steineck
BY
Attorney

Jan. 13, 1953  R. STEINECK  2,625,087
CONSTRUCTION FOR CAMERAS
Filed May 12, 1949  5 Sheets-Sheet 5

Fig. 20

INVENTOR.
Rudolf Steineck
BY

Attorney

Patented Jan. 13, 1953

2,625,087

UNITED STATES PATENT OFFICE 2,625,087

CONSTRUCTION FOR CAMERAS

Rudolf Steineck, Tutzing/Obb, Germany

Application May 12, 1949, Serial No. 92,846

22 Claims. (Cl. 95—38)

This invention relates to new and useful improvements in novel construction for cameras.

One object of the invention comprises among others a novel camera construction and preferably of the magazine type in which a single operation will effect the cocking of the shutter and release thereof.

A further object of the invention comprises a camera construction and preferably of the magazine type in which such single operation as, for instance, the depression and release of a shutter release button will actuate all essential operations of such camera including shutter cocking and release and the transport of the photo-sensitive surface into the next "exposure" position.

A still further object of the invention comprises a novel shutter release construction.

Still another object of the invention comprises a magazine type camera in which the magazine is automatically placed in light shield "open" position when loading the camera, and is automatically placed in light shield closed position when unloading the camera.

The foregoing and still further objects of the invention will be apparent from the following description read in conjunction with the drawings in which.

Figure 1:
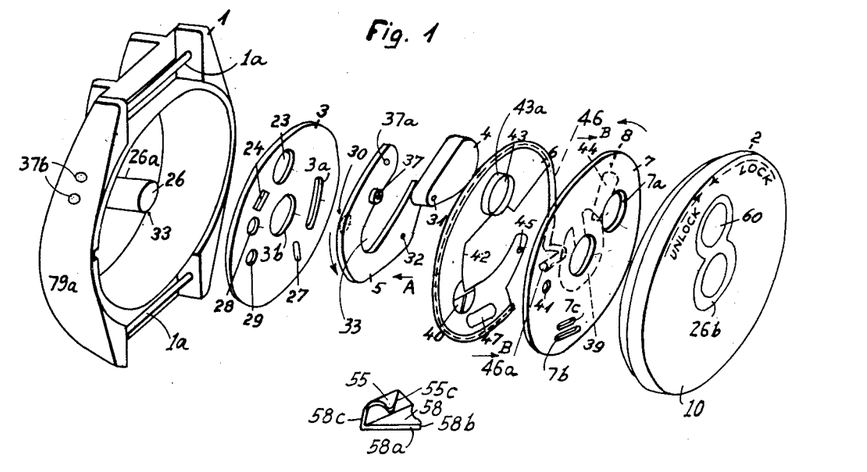
Fig. 1 is a perspective exploded view of a diagrammatic representation of some of the principal elements of a camera in accordance with the invention.
Figure 3:
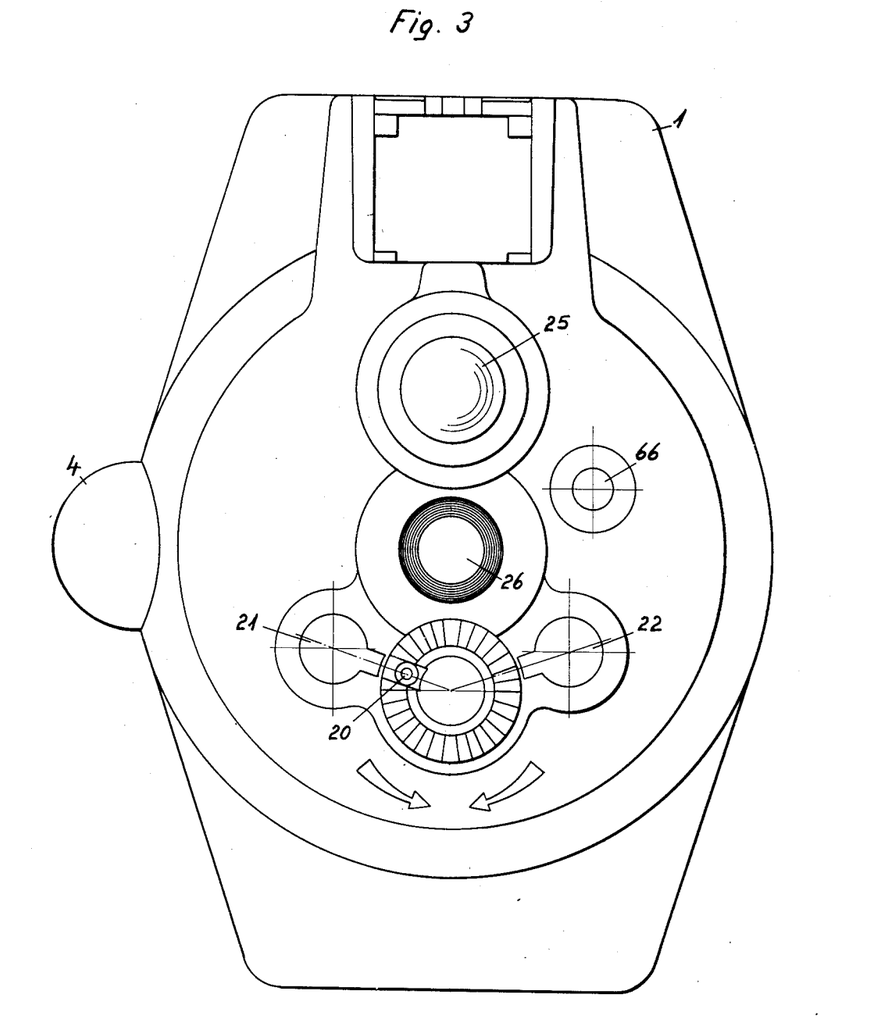
Fig. 3 represents a front view of a preferred embodiment of a camera in accordance with the invention.

Referring to Fig. 1 the housing 1 is provided with a central tubular member defining the bore 26. An aperture disc fits inside housing 1 and carries the different sized light apertures 23 and 24, as well as registry apertures 28 and 29 for observation of the "end of film" mark 30 on transmission arm 5. Aperture disc 3 further carries the guide slot 27 for the setting post 20 (Fig. 3). Transmission arm 5 carries shutter release button 4 pivotably secured by way of the pivot post 31. Transmission arm 5 carries aperture 32. Cut-out 33 of transmission arm 5 is so dimensioned that with the camera assembled it rests rotatably on an outer cylindrical surface portion of the tubular member defining the bore 26 with the axis of pivot through the aperture 32. Transmission arm 5 carries at one end thereof a roller 37 and above roller 37 an electrical contact 37a.

A light screening and positioning member 6 is provided in front of the transmission arm 5 and carries the exposure aperture 43, the cut-out 42, the pin-supporting aperture 45 and the rotatable locking slotted half disc 40. For improved precision of spacing and positioning of the elements 5 and 6, a pin (not shown) rests with one end in the aperture 45 of the platen member 6, passes through the pivot and guide aperture 32 of transmission arm 5 and through slot 3a in aperture disc 3.

Figure 4:
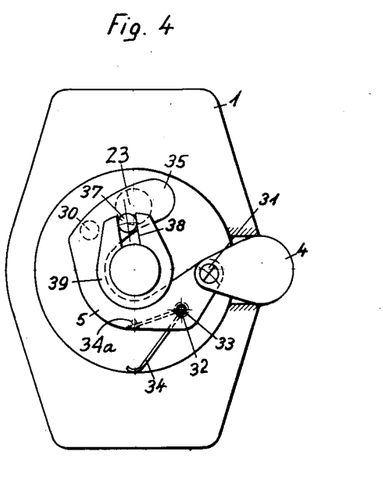
Fig. 4 illustrates a diagrammatic end view (in the direction of arrow A of Fig. 1) showing shutter transmission arm arranged within the camera housing with the shutter release button in the "non-depressed" position.
Figure 6:
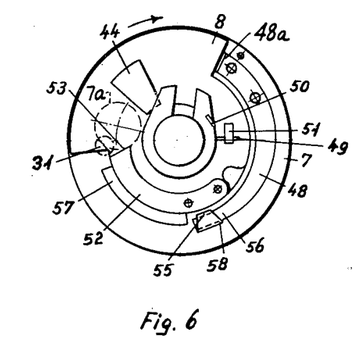
Fig. 6 is a diagrammatic plan view (in the direction of arrow B of Fig. 1) representing housing closure disk and shutter arrangement with the shutter release button in the "non-depressed" position corresponding to Fig. 4.
Figure 7:
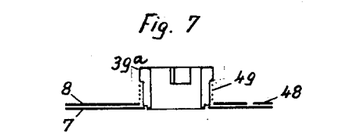
Fig. 7 is a diagrammatic cross-sectional representation of the construction shown in Fig. 6.

A housing closure disc 7 is provided carrying the shutter member 8 (see Figs. 6 and 7). Closure disc 7 is provided with the window 7a and carries secured thereto the tubular transmission member 39 extending towards the front of the housing 1 and defining the slot 38. When the camera is assembled the tubular transmission member 39 extends through aperture 42 to just in front of the transmission arm 5 engaging with the slot 38 the roller 37 (Fig. 4). A key hole 41 is carried by the closure disc 7 and can be brought to registry with a locking half disc 40 when assembling the camera, so as to insert a suitable key or other tool in order to turn the half disc 40 into the cut-out 42 of the platen member 6. The half disc locking member 40 can be brought to catch under the collar 39a (Fig. 7) of the tubular member 39 so as to lock the closure disc 7 and with it the thereto secured shutter disc 8 in position, avoiding the possibility of an axial displacement thereof. Closure disc 7 further carries the cut-out slots 7b and 7c, serving to accommodate double fingered member 58b. The latter carries the shorter lifting finger 55 (to pass through slot 7c) having the cammed or slanted surface 55b, and the longer film transport finger 58 (to pass through slot 7b) having the cammed or slanted surface 58a.

Figure 2:
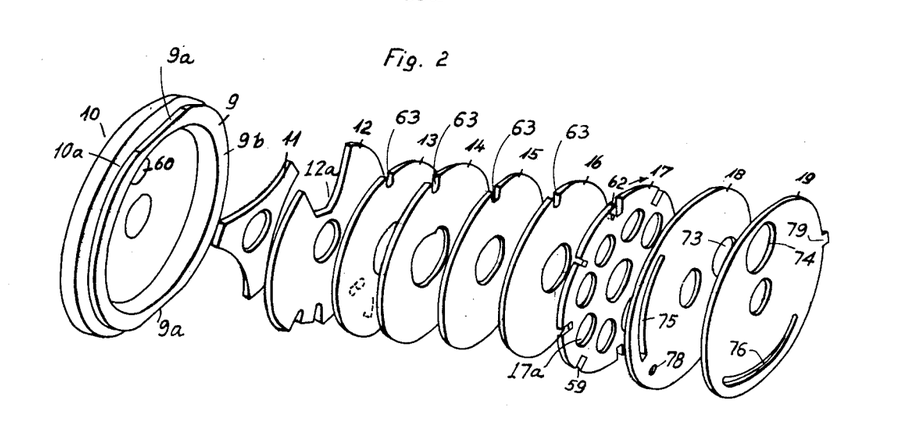
Fig. 2 is a perspective exploded view of a diagrammatic representation of some of the principal elements of a camera magazine in accordance with the invention.

The magazine 2 carries on its back wall 10 the counter window 60 and a central aperture. The various parts of the magazine are more fully described below.

Figure 20:
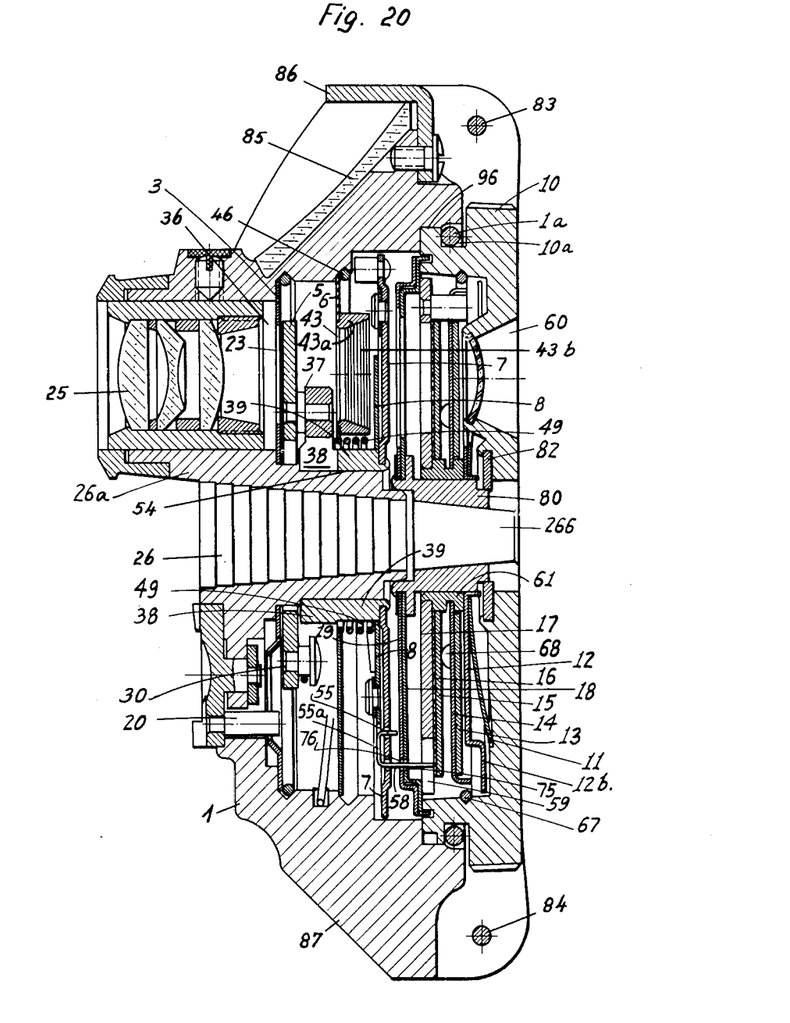
Fig. 20 is a cross-sectional side view of a preferred embodiment of the invention illustrated in Fig. 3.

As is more fully apparent from Fig. 20, the tubular member 26a, defining the bore 26, passes through the housing to a point of registry with the bore 26b defined by the tubular member 80 within the magazine. The outer portion of the tubular member 26a is machined to provide various bearing surfaces for parts 3 and 5 as well as for parts 6, 7 and 8 by way of tubular transmission member 39. Bore 26 is preferably conically shaped and bore 26b, within magazine 2, is preferably also conically shaped, with the wider portion of conical bore 26b overlapping the narrower portion of bore 26 at their point of registry. Further within the preferred construction the conical bore 26 is prepared by multiple individual cylindrical bores of decreasing diameter, thus giving a terracing effect. Bores 26 and 26b are used as a view-finder and the terracing of bore 26 aids in the elimination of undesirable light diffusion within the viewer. Bores 26 and 26b are further so arranged that parallaxis exists with the optical axis of the camera defined by the lens system 25. If desired bore 26 may also serve the insertion of a post or other member for securing the camera to a tripod or similar support.

Referring to Fig. 2 the magazine comprises a magazine housing 9 having a back wall portion 10 provided with central aperture 26b and counter window 60. There are further provided a spider spring 11, a spring disc 12, a counter disc 13, a tension disc 14, a film positioning disc 15, the multiple exposure photo-sensitive material disc 16, the film transport and exposure disc 17, the magazine cover disc 18 and the light screen disc 19.

Figures 16, 16A, 17:
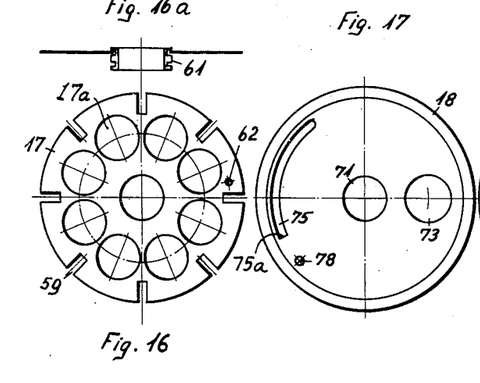
Figs. 16a and 19 represent diagrammatic cross-sectional views of part of the construction shown in Fig. 20
Figure 19:
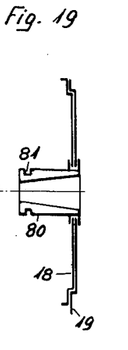

The spring disc 12 has a cut-out portion 12a for registry with the counter window 60 of the back wall 10 of magazine housing 9. Spring disc 12 is further provided with a dropped or bent rim 12b, leaving the portion 12c in the principal plane of the disc 12. There are further provided on disc 12 cut-outs 64a and 64b at either side of the disc portion 12c and establishing with the latter the stop shoulders 64 and 65 respectively. Spring disc 12 is mounted within magazine housing 9 in substantially stationary position on the tubular member 80 by way of the bushing member 61 (Figs. 16a, 19 and 20). It is spring cushioned in that position by the spider spring 11.

Counter disc 13 sits against disc 12 carrying the spaced numerals 1 to 8 and a numeral 0 between 8 and 1 on the side facing spring disc 12. Counter disc 13 further carries a transport notch 63 and is mounted rotatably on the bushing 61 positioned on the tubular member 80 (within the magazine housing 9).

Figure 14:
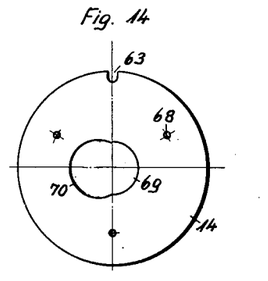
Figure 15:
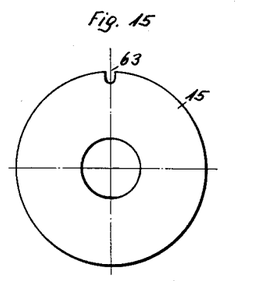

The tension disc 14 is provided in front of the counter disc 13 and carries the transport notch 63 (Fig. 14) and spacers 68 (Fig. 14) which maintain the film positioning disc 15 in substantially spaced and aligned relation. Tension disc 14 which is preferably slightly dished is further provided with the double cut-outs 69 and 70 serving to properly secure the same. Film positioning disc 15 is provided with a transport notch 63 and will support the disc of photo-sensitive material such as the film disc 16 which carries a similar transport notch.

Film transport disc 17 carries the multiple peripheral exposure openings 17a and in between any two adjacent exposure openings 17a the transmission transport notches 59 (Fig. 16). Film transport disc 17 further carries pin 62 for registry with the transport notches 63 of discs 13, 14, 15 and 16, which are thus locked together with film transport disc 17, being positioned as a unit on bushing 61 (Figs. 16a and 20) which is rotatably mounted on the outer bearing surface of the tubular member 80 within magazine housing 9.

Magazine cover disc 18 and light screen disc 19 are mounted on the tubular member 80 with the cover disc 18 in substantially stationary position and the disc 19 in thereto limitedly rotatable position. Magazine cover disc 18 is provided with slot 75, a stop-post 78 and magazine exposure window 73. Light screen disc 19 has the slotted aperture 76 for registry with aperture 75 though sufficiently long for stop-post 78 to pass through aperture 76 to establish the limits of movement to either side of light screen disc 19 relative disc 18. Disc 19 is also provided with a magazine exposure window 74 which may be brought into registry or out of registry relative exposure window 73. A magazine closure indicator 77 is provided on disc 19, the registry of which, with the stop-post 78 within slot 76, indicates closure of the magazine screen, i. e., "out of registry" position of exposure window 74 with exposure window 73. There is further provided a lug 79 at the periphery of disc 19 for fitting into the cut-out 79a of housing interior 1 (Fig 1).

The shutter release and film transport mechanism is described in detail in Figs. 4–9. As illustrated in Fig. 4, transmission arm 5 carries at one end release button 4 pivotably secured to the arm by way of the pivot-post 31. The tubular transmission member 39 secured to closure disc 7 engages with the slot 38 the roll 37. The other end of arm 5 serves as a light block 35 for the picture window or light aperture such as 23. The pivot pin or axle 33 carries spring 34 riding with one end against the stop 34a and riding with the beveled other end 34 on the interior of the housing 1. As is apparent from Figs. 6 and 7, the closure disc 7 carries in closely spaced relation thereto the shutter disc 8 having the shutter opening 44 and being held by the torsion spring 49 secured and stopped at one end in the slot 50 of the collar 39a of the tubular transmission member 39 and secured and stopped at its other end in the tension spring stop lug 51 carried by shutter disc 8. A spring leaf arm 52 having the butt end 53 is secured to the shutter disc 8. There is further provided on the latter a guide track or surface 57 (Fig. 6). Pivot-post 31 of arm 5 extends sufficiently beyond the surface of the thereto pivotably secured release button 4 to project into abutting relation with the butt end 53 of the spring leaf arm 52. Closure disc 7 carries secured thereto a film transport arm 48 having the spring leaf end 56 and mounted thereon the film transport finger 58 and the cammed lifting finger 55. Shutter disc 8 is provided with a peripheral cut-out portion permitting relative movement of the arm 48 in the clockwise direction of Fig. 6, the cut-out being so arranged that it forms a stop for the end 48a of the arm 48 when in the position shown in Fig. 6. The lifting finger 55 is relatively short and has a camming surface slanting downwardly in the direction of the guide track or surface 57, and finger 55 and track 57 are so dimensioned and arranged that they cooperate in camming action to lift finger 55 and thus spring leaf end 56 when causing arm 48 to be moved in clockwise direction. The cammed lifting finger 55 will normally project through slot 7c of disc 7 while transmission finger 58 projects through slot 7b in disc 7 (Figs. 1 and 20). With the magazine in position, finger 58 will pass through slots 76 and 75 to engage one of the transport notches 59 of transport disc 17 (Figs. 2 and 20).

Figure 5:
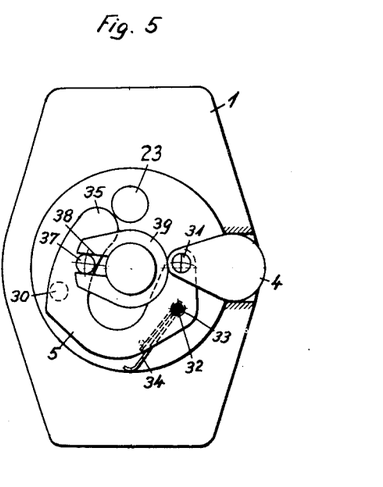
Fig. 5 shows the construction illustrated in Fig. 4 except that the parts are arranged with the shutter release button just prior to completely "depressed" position.
Figure 8:
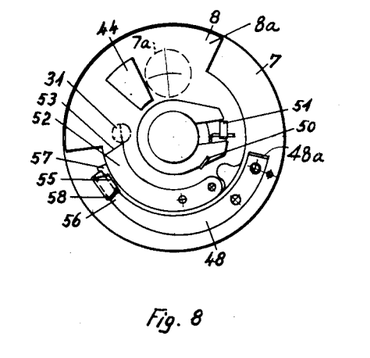
Fig. 8 illustrates the same diagrammatic plan view of the construction of Fig. 6 except that the parts are shown in the position assumed with the shutter release button just prior to completely "depressed" position corresponding to Fig. 5.
Figure 9:
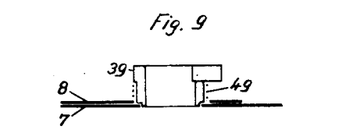
Fig. 9 is a diagrammatic cross-sectional representation of the construction shown in Fig. 8.

The practical operation of the shutter release and film transport mechanism of the camera in accordance with the invention is illustrated by reference to Figs. 5, 8 and 9. As there shown, the shutter release button 4 has been depressed almost completely. In that position, the shutter transmission arm 5 (Fig. 5) has been rotated about pivot pin or axle 33 within pivot aperture 32 loading spring 34 and removing the light block 35 from the light aperture 23. At the same time, the rotation of the arm 5 is transmitted to closure disc 7 by way of roll 37, tubular member 39 secured to disc 7 and engaging roll 37 in the slotted portion 38. This position is, for instance, illustrated in Figs. 8 and 9. By reason of the abutment of the butt end 53 of spring arm 52 against post 31, the shutter disc 8 has remained substantially stationary while the disc 7 has completed a rotation of almost 90°. In depressing release button 34, pivot 31 has moved inwardly and slightly upward with respect to the position it occupied with the release button in the non-depressed position, as illustrated by Fig. 6. As is shown in Fig. 8, the butt end 53 of spring arm 52 now rides with its inner corner about center of the pivot post, and just a slight additional movement will eliminate the stop action of the pivot-post 31. Up to this point, the rotation of disc 7 with shutter 8 remaining substantially stationary has resulted in a charge of the torsion spring 49 so that shutter disc 8 is now under spring load. If pivot 31 is now moved out of stopping position for the butt end 53 of arm 52, the spring load of torsion spring 48 will now cause shutter disc 8 to follow the rotation of disc 7.

When rotating disc 7 by depressing the release button 4, the film transport arm 48 is moved with the disc, bringing the lifting finger 55 into camming engagement with the guide track or surface 57, thereby lifting also the transport finger 58. Transport finger 58 in the position of Figs. 6 and 20 passes through slot 76 of magazine light screen 19, slot 75 of magazine cover 18 ending in one of the slots 59 of the film transport disc 17. The camming action of the finger 55 resulting from the rotation of disc 7 to the position shown in Fig. 8 results in the lifting of the spring leaf end 56 and thus of the film transport finger 58 out of registry with the transport slots or notches 59 in transport disc 17. The continued rotation of disc 7 at the same time moves the transport finger 58 within the slots 75 and 76 of discs 18 and 19 respectively to a position over the transport disc 17 removed from the original a distance equivalent to the distance of rotation of disc 17. The depression of release button 4 and thus the rotation of disc 7 further results in placing the exposure window 7a of disc 7 into exposure registry position with a light aperture 23, the exposure aperture 43, exposure windows 74 and 73, and one of the exposure apertures 17a.

Once a release button is in the fully "depressed" position, i. e., when pivot-post 31 (Fig. 8) has moved out of the way of the butt end 53 of the spring leaf arm 52, the loaded torsional spring 49 causes shutter disc 8 to be turned so that the relative position of shutter disc 8 and closure disc 7 are again the same as indicated in Fig. 6. As the shutter disc is released by the inward motion of pivot pin 31 and out of its "stop" position with the butt end 52, the shutter opening 44 moves across the exposure window 7a of disc 7. As in the position of parts of the camera including the magazine thereof the various light apertures and windows are in registry with the optical axis of the camera the movement of the shutter opening 44 across window 7a will cause exposure of the photo-sensitive surface portion of film disc 16 defined by one of the multiple openings 17a within transport disc 17. After the shutter release by the further inward movement of pivot-post 31, the shutter disc 8 will come to rest with the shoulder 8a against the end 48a of the transport arm 48. The lifting finger 55, having now been removed from guide track 57, permits the transport finger 58 to snap back and since the rotation of disc 7 was for more than an angle of 45°, the transport pin will come to rest on the transport disc 17 between the second and the first film transport notch following the notch from which finger 58 was lifted when first depressing the shutter release button 4.

After completely depressing shutter release button 4 and having obtained the release of disc 8, pivot-post 31 will now assume a position on the inside of the inner periphery of the spring leaf arm 52. Spring arm 52 is relatively thin and held at its secured end tightly against the shutter disc 8 so that it will normally clear the end of pivot-post 31 when the same moves again outwardly. the end portion of the spring leaf arm 52 carrying the butt end 53 is raised so that it may cooperate with the pivot-post 31 as a stop to permit charging of the torsion spring 49 as hereinabove discussed.

Upon releasing the actuating pressure such as finger or hand pressure from release butt 4 after the complete depression thereof and release of the cocked shutter 8, the loaded spring 34 slidably engaging the interior of housing 1 (Fig. 5) will cause transmission arm 5 to be pivoted around the pivot pin or axis 33 until it again assumes its original position as shown in Fig. 4 with the release button in the "non-depressed" position. As the arm 5 turns to the starting position, it will also turn closure disc 7 together with shutter disc 8 into their original position shown in Fig. 6, the rotating motion being transmitted again through the tubular member 39 carried by disc 7 and engaging with the slot 38 the roll 37 carried by the arm 5. Pivot-post 31 again moves outwardly as disc 7 is turned back, moving over the depressed portion of the spring leaf arm 52 adjacent its secured end and riding up on arm 52 depressing the raised end portion thereof until it snaps into its starting position forming a stop for the butt end 53. In the meantime, while disc 7 is being turned back by loaded spring 34, the film transport finger 56 rides on the periphery of the film transport disc 17 until it snaps into the next film transport notch 59. The parts are so positioned relative each other and the angle of rotation of disc 7 to the shutter release position is such that on the return rotation of disc 7 the transport finger 58 snaps into its next transport notch 59 at a point when the remaining rotation of disc 7 is about 45°, i. e., the angular distance between transport notches of the discs which is the same as angular distance between centers of adjacent exposure apertures on disc 17. Thus, as disc 7 turns back, finger 58 first slides over the peripheral surface of disc 17, then snaps into the next transport notch 59 and while the rotation of disc 7 to its starting position is completed, the transport disc 17 is rotated for an angular distance of 45° thereby also rotating the counter disc 13, tension disc 14, film positioning disc 15, and film disc 16, which are locked to disc 17 for unit rotation by way of the lock-pin 62 engaging the transport notches 63.

Within the preferred construction in accordance with the invention suitable means are provided to maintain a time lag in the snapping back of the film transport finger 58 after the cammed lifting finger 55 has run off the track and for the first part of the return movement of disc 7. This may be, for instance, desirable for the purpose of avoiding the possibility of the pin engaging, upon its release, the second transport notch on film disc 17 and thus moving the transport disc and thereto locked unit for an angular distance of 90° instead of the required 45°. One means of accomplishing this is, for instance, by way of the sprung ring 46 (Fig. 1 and Fig. 20). This ring may serve the purpose of holding the positioning and light screening platen member 6 within housing 1 by wedging the platen member by means of the sprung ring 46 against shoulder 46a inside housing 1. Such ring would then serve the additional purpose of holding the transport finger 58 suspended during part of the return rotation of disc 7. Ring 46 is only partly closed and is bent at one end thereof at an angle of 90° to the plane of the ring, the bent portion being again bent at an angle of 90° parallel to the ring plane. Thus, the end of the ring would be essentially L-shaped, with the free leg 46a of the L forming a hook against the direction of rotation of disc 7 when depressing the shutter release button and being positioned in the line of travel of the loop 55a. When the disc 7 is rotated by depressing release button 4, the loop portion 55a is pushed inwardly by the camming action of finger 55 and then engages the hook portion 46a of ring 46. After shutter release is effected and the cammed lifting finger 55 has been removed again from the guide track or surface 57, the transport finger 58 will not immediately snap back but will be held in lifted position by the hook 46a until a predetermined rotation of disc 7 has moved the loop portion 55a to the end of the hook 46a, whence it drops off, thus snapping the finger 58 onto the peripheral surface of transport disc 17, on which it rides with the further rotation of disc 7 until it snaps into the transport notch 45° removed from that of its original position. Inasmuch as in all cases of rotation of the transport disc 17 for an angular distance of 45° there is an equivalent rotation of the counter-disc 13, the numerals on the back of that disc being equally spaced apart an angular distance of 45° will be turned to expose a new numeral visible through the counter-window 60 and cut-out 12a in spring disc 12. I prefer to apply the numerals in such sequence that they are rotated from the maximum to the minimum figure with the application of a zero between the two. In this manner there will be always indicated the number of exposures left in the magazine, with zero indicating complete exposure of the entire film disc.

Figure 12:
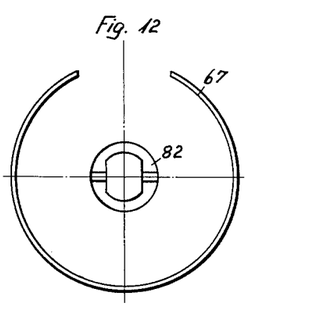
Fig. 12 shows in plan view a spring ring and magazine bayonet lock.
Figure 13:
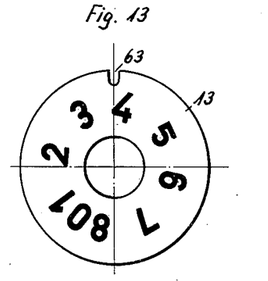

When assembling the magazine for use in a camera of the type discussed in accordance with the invention, an inner tubular member 80 is provided comprising a hollow mount for bushing 61 (Figs. 19 and 20). The inner bore of tubular member 80 is conically shaped with the narrower end emerging at the back wall portion 10 of the magazine housing 9. A bayonet lock ring 82 (Figs. 12 and 20) is secured to the inside of the back wall portion 10 of magazine housing 9 to cooperate with the bayonet locking lugs 81 (Fig. 19). Thus in the assembly of the magazine the various disc members 13–17 are assembled on the bushing 61, which is rotatable around the tubular member 80. Spring 11 and disc 12 are held in position within the magazine housing 9 by a spring washer 67 (Figs. 12 and 20). The unit assembly comprising magazine cover discs 18 and light screen disc 19 secured to tubular member 80 and disc units 13–17 secured to bushing 61, rotatably mounted on tubular member 80, is then inserted into the magazine housing 9, whereby the end portion of tubular member 80 will pass through the central cut-outs of the spring 11 and disc 12 to be locked by a turning motion by engagement of the bayonet locking lug 81 and the locking ring 82.

Aside from the magazine, the normal position of parts in the camera is as indicated in Figs. 4, 6, 7 and 20. The aperture disc 3 is mounted within the housing 1 with its central aperture 3b rotatable on a bearing shoulder of the tubular member 26a. Aperture disc 3 is held in substantially stationary position by the setting post 20 on the front of the housing 1 (Fig. 3) which extends into the radial guide slot 27. Position of setting post 20 in relation to either one of the two aperture indicator marks 21 and 22 defines registry of either light aperture 23 or light aperture 24 with the optical axis of the lens system 25. Movement of the post from one to the other of the indicator marks will rotate aperture disc 3 thereby bringing into registry the light aperture corresponding to the changed setting of the post. Suitable color indication on marks 21 or 22 may be a visual aid in determining whether the larger aperture required for less available light or the smaller aperture for relatively bright light is to be used. The light block 35 is in front of the light aperture of disc 3, the button is in the released position, the aperture 43 of the platen member 6 is in registry with the optical axis of the camera lens system. The platen member 6 is mounted substantially stationary within housing 1, and is held in position by the sprung ring 46. The closure disc 7 is in the closed position, i. e., with its exposure window 7a out of registry with the optical axis of the lens system 25. Thus within the camera proper, parts 3 and 6 are mounted in substantially fixed position with respect to the shutter transmission, whereas parts 5 and 7 are mounted for partial rotation. Aperture 43 is preferably provided with tubular light shield 43a defining the rearwardly widening conical light passage 43b, preferably terraced by multiple bores of increasing diameter.

In magazine 2 as assembled, spider spring 11, spring disc 17 and magazine cover disc 18 are positioned in substantially fixed non-rotatable relation. The disc unit composed of the elements 13, 14, 15, 16 and 17 is rotatably mounted, synchrony of rotation being effected by the pin 62 and the notches 63. The magazine light shield or light screen disc 19 is limitedly rotatable with respect to disc 18 by reason of the stop-post 78 within slot 76. The position of the various windows or apertures of parts in the magazine with respect to the optical axis of the camera when "loaded" is such that the windows 73 and 74 of discs 18 and 19 respectively are in registry with that axis, as well as with one of the apertures 17a of disc 17. However, when the camera is "unloaded," the magazine as such has the light shield 19 with its aperture 74 out of registry with the window of the cover disc 18.

Figure 18:
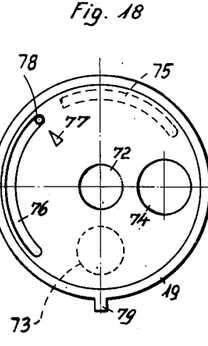

Within the preferred embodiment in accordance with the invention, the construction is such that when loading the camera with the magazine, the light shield of the magazine is automatically brought into the "open" position, i. e., with its exposure window into registry with the optical axis of the camera. On the other hand, when unloading the camera, the construction will automatically cause the light shield to be again moved into the "closed" position, i. e., out of registry with the optical axis. This is, for instance, accomplished by the lug 79, fitting into the notch 79a of housing 1. The closed position of the light shield or light screen disc 19 is, for instance, illustrated in Fig. 18 in which the position of the stop-post 78 within slot 76 is in registry with the indicator mark 77 to show the shield to be "closed." The relative positions of the aperture window 73 and slot 75 of the underlying disc 18 are shown in broken outline. When the magazine is now inserted into the camera housing, it is placed with the lug 79 into the notch 79a, the parts being so arranged that in this position the flattened rim portions 9a of the housing 9 of the magazine fit under the bars or pins 1a of the camera housing 1. A groove 10a is provided between the rim 9b and magazine housing back wall portion 10. If now the magazine is placed with the flattened portions 9a under the bars 1a to registry of the bars 1a with the groove 10a, a turn of the magazine relative the housing will cause the bars 1a to engage the rim 9b within groove 10a locking the magazine into position bayonet fashion. At the same time, the turning motion of the magazine, in order to lock the same into position, has caused a commensurate turning of its component parts (except light shield 19) to bring the exposure window 73 of disc 18, one of the exposure apertures 17a of disc 17, a numeral on counter disc 13, the cut-out 12a, and counter window 60, into registry with the optical axis of the camera. The position of lug 79 and notch 79a (for "closed" position of 19) is such that the window 74 of the disc 19 is placed in fixed registry with the optical axis of the camera. Thus, when inserting the magazine and securing the same, all exposure apertures except that of closure disc 7 are in exposure registry. When the camera is unloaded, however, the sequence of operations is reversed, and the turning back of the magazine to unlock the same from the bars 1a causes the positioning of its component parts and particularly that of window 73 of magazine cover disc 18 to be again moved out of registry with the window 74 of the light shield 19, the latter being thereby automatically placed into the "closed" position.

When loading the camera in the manner described above, the transport finger 58 is pressed against disc 18 through slot 76 in shield 19 (Fig. 18) being thereby lifted against the force of its spring arm 56 (Fig. 6). When the magazine is locked into position, the finger 58 rides on the turning disc surface 19 and over or out of the way of stop 78 to snap into one of the notches 59 as soon as registry with slot 75 is established. When unloading the camera, and disc 18 is again turned relative shield 19, the end 75a of slot 75 engages the camming surface 58a of finger 58 thereby again lifting the same out of the magazine and permitting the complete closure of slot 75 to the position shown in Fig. 18. The relatively sharp angled shoulder 58b of finger 58 serves as transport shoulder for rotating disc 17 when engaging a notch 59.

Figures 10, 11:
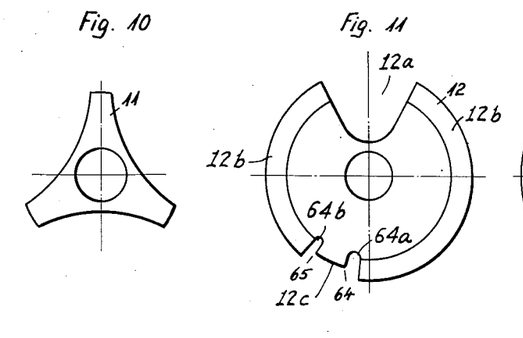
Figs. 10, 11 and 13–18 are plan views of various parts diagrammatically shown in Fig. 2.

There is further provided within the preferred embodiment of my invention means for preventing double exposure of the first exposed portion of the film disc after the last available exposure has been made. Spring disc 12 (Figs. 11 and 12) is for this purpose provided with a dropped or bent down rim 12b and the cut-outs 64a and 64b. The portion 12c is in the general plane of the remainder of disc 12 and is thus raised with respect to the dropped or bent rim 12b. In this manner, shoulders 64 and 65 are provided. Shoulder 64 is used as the "first exposure" stop and shoulder 65 as the "last exposure" stop. Locking pin 62 on film transport disc 17 is sufficiently long to project slightly beyond the notch 63 of the counter disc 13 and the rotatable disc unit of parts 13–17 are so inserted in the magazine that the projecting end of the lock-pin 62 abuts the first exposure stop 64 and numeral 8 of counter disc 13 being visible in that position through the cut-out 12a in the counter window 60. As the exposures progress, the end of pin 62 will ride around the dropped or bent rim 12b until it finally hits the "last exposure" stop 65 being thus prevented from moving into the original exposure position corresponding to the stop 64. When the end of pin 62 rests against the "last exposure" stop 65, the counter disc 13 will show the numeral 0 through the cut-out 12a and the counter window 60. The distance between stops 64 and 65 is preferably so arranged that the angle of rotation of the film transport disc 17 from 64 over 12a to 65 is substantially equal 360° minus ½ the angle of rotation of the transport disc 17 measured between centers of adjacent exposure apertures thereon. In this manner, a depression of the shutter release button will obtain an exposure in the "last exposure" position of the film disc but since the rotation cannot proceed further than ½ the angular difference between adjacent exposure apertures, the release button is prevented from returning to its "non-depressed" position so that actually a locking effect is obtained and no further exposure is possible. At the same time, the transmission arm 5 remains locked in the position shown in Fig. 5 in which an indicator mark 30 carried by arm 5 is in registry with the aperture 66 at the front of the housing 1 (Fig. 3) thereby further indicating the "completed" exposure of the entire film disc within the magazine.

It is of advantage to provide a synchronized flashlight release mechanism. For this purpose, a suitable electric contact such as contact 37a indicated on transmission arm 5 (Fig. 1) may be used. The electrical plug apertures 37b on the outside of housing 1 are arranged, and are provided within the interior of the housing with conventional means (not shown) to be engaged by the contact 37a upon rotation of the arm 5 around its pivot pin or axle 33 to thereby close the "flash" circuit. Contact 37a is so arranged that the closing of the "flash" circuit is obtained just a fraction prior to the release of the cocked shutter 8 as herein described.

Though the structures in accordance with the invention may be used without limitation as to size of camera, I find that the embodiments in accordance with the invention lend themselves advantageously to a miniature type camera and the arrangement and interrelation of parts permits the construction of a miniature camera sufficiently small for instance to be worn in wrist-watch fashion. Construction permits a single shutter opening fixed focus camera. It is, of course, understood that variable focus or shutter arrangements may be used should this be desirable particularly for larger dimensioned constructions.

The miniature type camera within the preferred embodiment of the invention has the further advantage of a centrally located direct viewer sufficiently close to the off-center optical axis that substantially parallaxis exists therebetween. If desired, an additional mirror view finder may be provided as, for instance, illustrated in Figs. 3 and 20 in which the highly polished slanted mirror surface preferably provided with a center sight 86 provides a suitable mirror view finder arrangement. In the wrist type camera illustrated in Figs. 3 and 20, the general outline of the camera housing approximates that of a wrist-watch and the same may be conventionally strapped to the wrist by suitable wrist bands secured to the housing by conventional spring bars such as those indicated at 83 and 84 (Fig. 20).

Within the particular construction in accordance with the invention, a further advantage resides in the fact that it is possible either by way of a separate additional disc arranged within the camera housing or by way of the aperture disc 3 to provide for various built-in filters which may be brought into registry with the optical axis of the camera by way of a suitable setting post or lever such as that used in connection with the setting of light apertures 23 and 24 by way of the setting post 20 as herein described.

A magazine type camera in accordance with the instant invention is particularly advantageous in that it permits the ordinary loading and unloading of the camera to be effected in a single manipulation without danger of exposure and under automatic safeguards of the closing and opening of the light shield. It has the further advantage that it is possible to remove the magazine at will after any number of exposures have been made. In this manner, a number of magazines carrying photo-sensitive material of different characteristics such as with respect to color, grain size, speed, etc., may be used. It is then possible by the mere substitution of one magazine for another to make at will in any desired sequence any exposure using any desired photo-sensitive material. This involves the further advantage that any number of exposures may be made using one magazine to thereafter replace the magazine with any other magazine and make any number of exposures on the latter. Any magazine with a partly exposed film may be reinserted at any time and any number of additional exposures made thereon.

Film discs useful in accordance with the invention may be obtained by cutting or punching from any suitable material either already having a photo-sensitized surface or being provided with such surface after the punching or cutting operation. Such film discs may be for instance of paper or other sheet material but are preferably made from conventional photographic film sheets or strips.

Within the preferred embodiment of the invention relating to a miniature type camera, I prefer to so construct the camera that the film discs are of a sufficiently small diameter so that they can be cut from the usual 35 mm. film strip. The miniature type camera in accordance with the invention is such that when using films coated with relatively small grained and low speed film emulsion it is possible to obtain without difficulty prints of about 20 magnification. The exposed film is such that the exposure may be even viewed directly without aid of magnification.

Within the preferred construction of the camera as herein exemplified, the danger of movement of the camera at the moment of shutter release as the result of coupled film transport is substantially eliminated by the arrangement provided for shutter release prior to effectuating transport of the film disc.

As is thus seen from the foregoing, a camera constructed in accordance with the invention essentially embraces the combination comprising a spring returnable shutter release, means for rotatably holding a photo-sensitive disc in off-center position to the optical axis of such camera and with its axis of rotation substantially parallel to such axis, means for rotating such disc around its said axis, shutter actuating spring means, and transmission means cooperatively connected to said shutter release, said disc rotating means and said spring means to load, and snap release said spring means and actuate said disc rotating means to transport such disc a predetermined angular distance upon actuation of said release.

Within the preferred construction of such camera combination the transmission means essentially include first means spring returnably rotatable and secured to said release for actuation thereby, second means rotatably mounted in cooperative relation to said spring means to load and snap release the same upon rotary motion of said second means, and third means mounted in cooperative relation to said first and second means to transmit rotary motion from said first to said second means, the disc rotating means being mounted in cooperative relation to one of said release and of said transmission means in disc transport position transmitting a predetermined rotary motion to such disc following snap release of said spring means.

A still further advantage residing in the camera construction in accordance with the invention is that of permitting an effective simplified successfully synchronized flash release arrangement. It has been necessary in the past to resort to cumbersome arrangements for flash release. These usually necessitate the use of ancillary equipment including spring means or the like involving a movement of parts for flash release and usually actuated by a spring which must be pre-loaded. Alternatively, it has been necessary to attempt to obtain synchrony of flash release by extraneous visual aids such as light bulbs to determine approximate coincidence of flash release and shutter opening. In all cases, however, maximum efficient synchronization has been difficult to obtain. In a camera constructed in accordance with an embodiment of the instant invention, however, it is possible to provide a flash actuating mechanism such as a contact or switch arm to one of the moving parts within the camera, be it the release, the rotatable arm, the spring loading member, the closure disc or the shutter itself so that, upon actuation of the release and in cooperation with a suitable flash circuit closing mechanism within the housing, the flash release will set off the flash just a fraction prior to the movement of the shutter window across the optical axis of the camera. The flash release such as a contact pin, for instance, as diagrammatically shown on the arm in Fig. 1, is then so positioned with respect to its action upon the circuit closing mechanism that the flash will have developed its maximum incidence at about the time the center of the shutter opening crosses the optical axis of the camera.

I claim:

1. In a camera the combination comprising a spring returnable shutter release, means for rotatably holding a photo-sensitive disc in off-center position to the optical axis of such camera and with its axis of rotation substantially parallel to such optical axis, means for rotating such disc around its said axis, shutter actuating spring means, and transmission means cooperatively connected to said shutter release, said disc rotating means and said spring means to load and snap release said spring means and actuate said disc rotating means to transport such disc a predetermined angular distance upon actuation of said release, said transmission including first means spring returnably rotatable and secured to said release for actuation thereby, second means rotatably mounted in cooperative relation to said spring means to load and snap release the same upon rotary motion of said second means, and third means mounted in cooperative relation to said first and second means to transmit rotary motion from said first to said second means, said disc rotating means being mounted in cooperative relation to one of said release and of said transmission means in disc transport position transmitting a predetermined rotary motion to such disc following snap release of said spring means.

2. The combination in accordance with claim 1 in which there are included a rotatable shutter, first stop means thereon and second stop means mounted in cooperative relation to one of said release and said transmission means for stop engagement with said first stop means during the first part of the rotation of said second means and for disengagement during the last part of such rotation, in which said spring means comprise a torsion spring secured at one end to said shutter for load release spring rotation thereof and with its other end to said second means for spring loading against said stop means upon rotation of said second means.

3. The combination in accordance with claim 2 in which said second stop means are secured to one of said release and said transmission means for movement therewith to define, upon rotation of said second means, a path of travel for said second stop means first along said first stop means in stop engagement therewith and then away from said first stop means out of such engagement.

4. The combination in accordance with claim 3 in which there are additionally provided means mounted in cooperative relation to said disc rotating means and one of said release and said transmission means to remove said rotating means from its disc transport position and to return said rotating means to said position following the disengagement of said first and second stop means.

5. The combination in accordance with claim 4 in which said disc holding means are mounted in a removable magazine for such camera and in which said disc rotating means are disconnectably arranged to permit removal of said magazine.

6. The combination in accordance with claim 4 in which means are included defining a view finder through said camera substantially co-centric with said axis of rotation.

7. The combination in accordance with claim 4 in which said camera includes a housing and a therefrom removable magazine in which said disc holding means are mounted in said magazine, in which said disc rotating means are disconnectably arranged to permit removal of said magazine, in which means are included in said magazine defining a view finder passage therethrough substantially co-centric with said axis of rotation, and in which means are included in said housing defining a view finder passage therethrough in substantial parallaxis with the optical axis of such camera and in registry with said magazine passage when said magazine is in position relative said housing, said passages then collectively defining a view finder through said camera.

8. In a camera, the combination which comprises a spring returnable shutter release, a rotatable shutter, first stop means thereon, a torsion spring secured at one end to said shutter for load release spring rotation thereof, spring returnable rotatable transmission means including a rotatable disc member carrying rotatable therewith a film disc transport finger raisable from a film-engaging into a film-non-engaging position against spring force, second stop means secured to one of said release and said transmission means for movement therewith to define upon rotation of said transmission means a path of travel for said second stop means, first along said first stop means in stop engagement therewith, and then away from said first stop means out of such engagement, said transmission being secured to said release for actuation thereby and to the other end of the said spring for spring loading against said stop means upon rotation of said transmission means, and camming means positioned to raise said film disc transport finger into said non-engaging position and substantially maintain the same therein at least until said first stop means are passed out of engagement with said second stop means.

9. The combination in accordance with claim 8 in which said camming means include a guide track on said shutter and a camming finger secured to said transport finger and positioned to cam up on said track upon rotation of said disc member thereby raising said transport finger into said non-engaging position and to cam off said track upon rotation of said shutter to thereby release said transport finger.

10. The combination in accordance with claim 9 in which said transport finger forms with one side of its end, in the direction of return rotation of said disc member upon spring return of said release, a transport shoulder and forms with at least a portion of its opposite side a camming surface.

11. The combination in accordance with claim 10 in which said disc member substantially forms a closure disc for the housing of a magazine loading type camera, in which said transport finger extends through said closure disc and in which said disc defines an exposure window positioned thereon for substantial alignment with the optical axis of said camera upon rotation of said closure disc prior to shutter release.

12. In a camera, the combination which comprises a spring returnable substantially linearly movable shutter release carrying a stop, a rotatable shutter with a guide track provided thereon, a shoulder on said shutter, an arm secured to said release and mounted for rotation thereby, a rotatable spring loading member including a rotatable disc member carrying a film disc transport finger raisable from a film-engaging into a film-non-engaging position against spring force, means secured to said arm and cooperating with said loading member for rotating the same upon rotation of said arm, said stop being normally positioned in stop-engagement with said shoulder and for movement with said release first continuing such engagement and thereafter out of such engagement, a torsion spring secured at one end to said shutter for load release spring rotation thereof and at its other end to said loading member for spring loading, a camming finger secured to said transport finger and positioned to cam up on said track upon rotation of said disc member, thereby raising said transport finger into said non-engaging position and to cam off said track upon rotation of said shutter to thereby release said transport finger, said transport finger forming with one side of its end in the direction of return rotation of said disc member upon spring return of said release a transport shoulder and forms with at least a portion of its opposite side a camming surface.

13. The combination in accordance with claim 12 in which said disc member substantially forms a closure disc for the housing of a magazine loading type camera, in which said transport finger extends through said closure disc and in which said disc defines an exposure window positioned thereon for substantial alignment with the optical axis of said camera upon rotation of said closure disc prior to shutter release.

14. The combination in accordance with claim 13 in which said spring loading member includes in addition to said disc a tubular member at least partly within said torsion spring and substantially co-axial therewith, substantially parallel to the optical axis of such camera, in which said tubular member defines a radial slot, in which said arm-secured means comprise a roll carried at one end thereof and extending into said slot and in which means are provided defining a view finder passage through said tubular member from the front of such housing to the center of said closure disc in substantial parallaxis to such optical axis.

15. In a camera magazine for use in a camera and removably secured to the housing of such camera by a turning motion, the combination which comprises a magazine housing, means defining an optical axis for such magazine, means for rotatably holding a substantially circular piece of photo-sensitive material in said magazine housing in off-center position to said optical axis, a light shield defined by a disc co-axially rotatable with said holding means, an exposure window in said light shield, means for rotating said shield from a window-closed position to a window-open position, a substantially stationary disc defining an exposure window in registry with said optical axis, said shield and said closure disc each defining a peripheral slot therethrough, said slots being in registry with each other when said shield is in the open position to receive therethrough a film disc transport finger of such camera and said slots being out of registry when said shield is in the closed position.

16. The combination in accordance with claim 15 in which said holding means include a rotatable film positioning disc and a rotatable film transport disc defining multiple exposure openings therein and being mounted for registry of said openings with said optical axis upon rotation thereof, in which said transport disc defines multiple peripheral transport notches and in which means are provided for locking together, for unit rotation, said positioning disc, said transport disc and any film disc held therebetween.

17. The combination in accordance with claim 16 in which there are additionally provided stop means for said transport disc positioned for operation against rotation of said disc in which said disc openings are so arranged that one of said openings is in registry with said optical axis when said transport disc engages said stop and in which said multiple openings are substantially spaced apart equal angular distances on said transport disc.

18. The combination in accordance with claim 17 in which there are included additional stop means engageable by said transport disc upon rotation thereof subsequent to registry with the last of said multiple openings following the first said opening controlled by said first stop.

19. The combination in accordance with claim 18 in which there are additionally included counter means operatively connected to said transport disc for numerically evaluating each positioning of a transport disc opening with said optical axis.

20. The combination in accordance with claim 18 in which a view finder passage is collectively defined by all the elements of said camera magazine, positioned co-axial with said discs and extending through said magazine.

21. The combination in accordance with claim 20 in which there are further provided a counter disc co-axially rotatable with said transport disc, secured for co-axial rotation with said transport disc, and a window in said housing for viewing the registering numbers of said counter disc and in which said passage passes co-axially through said counter disc.

22. In a camera of the miniature type, the combination comprising a housing and a magazine removably securable therein, means defining an optical axis for such camera and means defining a view finder through said camera including said magazine in parallel axis to said optical axis, said view finder passing from the front of said camera to the back of the housing of said magazine, means in said magazine for rotatably positioning a centrally cut out film disc substantially coaxial with the axis of said view finder in off-center position to said optical axes.

RUDOLF STEINECK.

REFERENCES CITED

The following references are of record in the file of this patent:

UNITED STATES PATENTS

| Number | Name | Date |
|---|---|---|
| 318,701 | Correja | May 26, 1885 |
| 517,539 | Caster | Apr. 3, 1894 |
| 1,127,539 | Stern | Feb. 9, 1915 |
| 1,434,026 | Sandell | Oct. 31, 1922 |
| 1,488,488 | Froelich | Apr. 1, 1924 |
| 1,902,278 | Chase | Mar. 21, 1933 |
| 1,905,956 | Watson | Apr. 25, 1933 |
| 1,991,146 | Fuerst | Feb. 12, 1935 |
| 2,083,492 | Cheshire | June 8, 1937 |
| 2,188,974 | Dilks | Feb. 6, 1940 |
| 2,226,245 | Kende | Dec. 24, 1940 |
| 2,384,639 | Riddell | Sept. 11, 1945 |
| 2,391,377 | Aiken | Dec. 25, 1945 |
| 2,446,200 | Tait | Aug. 3, 1948 |
| 2,478,301 | Mourfield | Aug. 9, 1949 |
| 2,511,334 | Gruber | June 13, 1950 |
| 2,531,651 | Tait | Nov. 28, 1950 |
| 2,531,936 | Fairbanks | Nov. 28, 1950 |

FOREIGN PATENTS

| Number | Country | Date |
|---|---|---|
| 202,046 | Great Britain | Aug. 13, 1923 |